US011775972B2

(12) United States Patent
Imazato

(10) Patent No.: US 11,775,972 B2
(45) Date of Patent: Oct. 3, 2023

(54) SERVER, PROCESSING APPARATUS, AND PROCESSING METHOD

(71) Applicant: NEC Corporation, Tokyo (JP)

(72) Inventor: Kazuhiro Imazato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/280,238

(22) PCT Filed: Sep. 13, 2019

(86) PCT No.: PCT/JP2019/036061
§ 371 (c)(1),
(2) Date: Mar. 26, 2021

(87) PCT Pub. No.: WO2020/066691
PCT Pub. Date: Apr. 2, 2020

(65) Prior Publication Data
US 2022/0051256 A1  Feb. 17, 2022

(30) Foreign Application Priority Data

Sep. 28, 2018 (JP) .................................. 2018-185175

(51) Int. Cl.
*G06Q 20/40* (2012.01)
(52) U.S. Cl.
CPC .............................. *G06Q 20/40145* (2013.01)
(58) Field of Classification Search
None
See application file for complete search history.

(56) References Cited

U.S. PATENT DOCUMENTS

| 6,819,219 | B1 * | 11/2004 | Bolle ............... G06Q 20/40145 340/5.82 |
| 7,004,389 | B1 | 2/2006 | Robinson et al. |
| 7,494,061 | B2 * | 2/2009 | Reinhold ............ H04M 3/2281 235/382 |
| 10,187,754 | B1 * | 1/2019 | Hansen ................. H04L 9/3297 |
| 10,373,246 | B1 * | 8/2019 | Groenjes ............... G06Q 40/00 |
| 10,701,067 | B1 * | 6/2020 | Ziraknejad ............ H04W 12/63 |

(Continued)

FOREIGN PATENT DOCUMENTS

| JP | 2002-140399 A | 5/2002 |
| JP | 2002-143130 A | 5/2002 |

(Continued)

OTHER PUBLICATIONS

Gupta, Sandeep, Attaullah Buriro, and Bruno Crispo. "DriverAuth: A risk-based multi-modal biometric-based driver authentication scheme for ride-sharing platforms." Computers & Security 83 (2019): 122-139. (Year: 2018).*

(Continued)

*Primary Examiner* — Daniel S Felten
*Assistant Examiner* — Claire A Rutiser

(57) ABSTRACT

The present invention provides a server (10) including an authentication result acquisition unit (11) that acquires a result of biometric authentication of a service provider based on biometric information repeatedly acquired from the service provider heading toward an appointment location for a customer, and a result transmission unit (12) that transmits the result of the biometric authentication of the service provider to a terminal of the customer.

5 Claims, 16 Drawing Sheets

| TASK ID | SERVICE PROVIDER ID | CUSTOMER ID | APPOINTMENT LOCATION | APPOINTMENT TIME | DEPARTURE FLAG | COMPLETION FLAG | .... |
|---------|---------------------|-------------|----------------------|------------------|----------------|-----------------|------|
| T00001 | D03113 | C13112 | TOKYO-TO ... (HOME) | 13 : 00 | ✓ | ✓ | .... |
| T00002 | D02111 | C00028 | TOKYO-TO ... (OTHER THAN HOME) | 13 : 15 | ✓ | | .... |
| T00003 | D00029 | C13100 | TOKYO-TO ... (OTHER THAN HOME) | 13 : 30 | | | .... |
| . . . | . . . | . . . | . . . | . . . | . . . | . . . | . . . |

(56) References Cited

U.S. PATENT DOCUMENTS

| | | | |
|---|---|---|---|
| 10,735,889 B1* | 8/2020 | Buscemi | G07C 1/10 |
| 11,184,766 B1* | 11/2021 | Lord | G06V 10/75 |
| 2002/0057805 A1 | 5/2002 | Kato et al. | |
| 2002/0095586 A1* | 7/2002 | Doyle | G06F 21/32 |
| | | | 713/186 |
| 2002/0186688 A1* | 12/2002 | Inoue | H04W 12/068 |
| | | | 370/352 |
| 2003/0217151 A1* | 11/2003 | Roese | H04L 63/10 |
| | | | 709/225 |
| 2004/0069846 A1* | 4/2004 | Lambert | G06F 21/32 |
| | | | 235/382 |
| 2005/0068169 A1* | 3/2005 | Copley | G08B 29/046 |
| | | | 340/568.1 |
| 2005/0068171 A1* | 3/2005 | Kelliher | G08B 21/0283 |
| | | | 340/539.22 |
| 2005/0272445 A1* | 12/2005 | Zellner | H04M 3/42357 |
| | | | 455/456.2 |
| 2006/0288234 A1* | 12/2006 | Azar | G06V 40/172 |
| | | | 713/186 |
| 2007/0174612 A1* | 7/2007 | Urban | G07C 9/00309 |
| | | | 713/168 |
| 2012/0268241 A1* | 10/2012 | Hanna | G06F 21/32 |
| | | | 340/5.52 |
| 2013/0239191 A1* | 9/2013 | Bostick | G06F 21/32 |
| | | | 726/7 |
| 2013/0298202 A1* | 11/2013 | Warshavsky | H04L 69/24 |
| | | | 726/4 |
| 2014/0007223 A1* | 1/2014 | Han | G06F 21/32 |
| | | | 726/16 |
| 2014/0237587 A1* | 8/2014 | Forbes | G06F 21/32 |
| | | | 726/18 |
| 2014/0380425 A1* | 12/2014 | Lockett | G06F 21/00 |
| | | | 726/4 |
| 2015/0066762 A1* | 3/2015 | Chatterton | G06Q 20/322 |
| | | | 705/44 |
| 2015/0121464 A1* | 4/2015 | Hughes, Jr. | G06F 21/31 |
| | | | 726/4 |
| 2015/0123766 A1* | 5/2015 | St. John | G07C 9/25 |
| | | | 340/5.82 |
| 2015/0227727 A1* | 8/2015 | Grigg | G06F 21/31 |
| | | | 726/4 |
| 2016/0090055 A1* | 3/2016 | Breed | B60R 25/25 |
| | | | 701/2 |
| 2016/0267516 A1* | 9/2016 | Walz | G06Q 20/387 |
| 2017/0187707 A1* | 6/2017 | Miu | H04L 63/0823 |
| 2017/0200250 A1* | 7/2017 | Grissen | G06Q 10/063114 |
| 2018/0075565 A1* | 3/2018 | Myers | G05D 1/0088 |
| 2018/0192292 A1* | 7/2018 | Coney | H04W 12/065 |
| 2018/0307818 A1 | 10/2018 | Yano et al. | |
| 2019/0197544 A1* | 6/2019 | Frost | G06Q 40/00 |

FOREIGN PATENT DOCUMENTS

| | | |
|---|---|---|
| JP | 2002-165778 A | 6/2002 |
| JP | 2003-281281 A | 10/2003 |
| JP | 2005-182146 A | 7/2005 |
| JP | 2018-151838 A | 9/2018 |
| WO | 2017/069118 A1 | 4/2017 |

OTHER PUBLICATIONS

Gupta, S., Buriro, A., & Crispo, B. (2019). DriverAuth: A risk-based multi-modal biometric-based driver authentication scheme for ride-sharing platforms. Computers & Security, 83, 122-139. (Year: 2018).*

International Search Report for PCT Application No. PCT/JP2019/036061, dated Dec. 3, 2019.

Japanese Office Action for JP Application No. 2020-548459 dated May 17, 2022 with English Translation.

* cited by examiner

FIG. 7

| TASK ID | SERVICE PROVIDER ID | CUSTOMER ID | APPOINTMENT LOCATION | APPOINTMENT TIME | DEPARTURE FLAG | COMPLETION FLAG | ... |
|---|---|---|---|---|---|---|---|
| T00001 | D03113 | C13112 | TOKYO-TO ... (HOME) | 13:00 | ✓ | ✓ | ... |
| T00002 | D02111 | C00028 | TOKYO-TO ... (OTHER THAN HOME) | 13:15 | ✓ | | ... |
| T00003 | D00029 | C13100 | TOKYO-TO ... (OTHER THAN HOME) | 13:30 | | | ... |
| ... | ... | ... | ... | ... | ... | ... | ... |

SERVER, PROCESSING APPARATUS, AND PROCESSING METHOD

This application is a National Stage Entry of PCT/JP2019/036061 filed on Sep. 13, 2019, which claims priority from Japanese Patent Application 2018-185175 filed on Sep. 28, 2018, the contents of all of which are incorporated herein by reference, in their entirety.

TECHNICAL FIELD

The present invention relates to a server, a processing apparatus, a processing method, and a program.

BACKGROUND ART

Patent Documents 1 to 3 disclose technology for performing personal authentication using acoustic characteristics of an auditory system.

RELATED DOCUMENT

Patent Document

[Patent Document 1] International Publication No. 2017/069118
[Patent Document 2] Japanese Patent Application Publication No. 2002-165778
[Patent Document 3] Japanese Patent Application Publication No. 2002-143130

SUMMARY OF THE INVENTION

Technical Problem

A service in which a service provider who receives a request from a customer meets the customer in a predetermined appointment location and performs a predetermined work is present. For example, the service is illustrated by a taxi service, a delivery service, and a car sharing service. In recent years, the above service has been widely provided by an ordinary person as the service provider based on a request from another ordinary person.

In the service, a scheme for avoiding trouble such that a person having deceitful purposes meets the customer and deceives the customer by impersonating the service provider receiving the request from the customer is necessary. An object of the present invention is to provide technology for reducing occurrence of such trouble.

Solution to Problem

According to the present invention, there is provided a server including an authentication result acquisition unit that acquires a result of biometric authentication of a service provider based on biometric information repeatedly acquired from the service provider heading toward an appointment location for a customer, and a result transmission unit that transmits the result of the biometric authentication of the service provider to a terminal of the customer.

In addition, according to the present invention, there is provided a processing method executed by a computer, the processing method including an authentication result acquisition step of acquiring a result of biometric authentication of a service provider based on biometric information repeatedly acquired from the service provider heading toward an appointment location for a customer, and a result transmission step of transmitting the result of the biometric authentication of the service provider to a terminal of the customer.

In addition, according to the present invention, there is provided a program causing a computer to function as an authentication result acquisition unit that acquires a result of biometric authentication of a service provider based on biometric information repeatedly acquired from the service provider heading toward an appointment location for a customer, and a result transmission unit that transmits the result of the biometric authentication of the service provider to a terminal of the customer.

In addition, according to the present invention, there is provided a program causing a computer to function as an authentication information acquisition unit that acquires authentication information including at least one of biometric information repeatedly acquired from a service provider or the customer heading toward an appointment location, and a result of biometric authentication based on the biometric information, and an authentication information transmission unit that transmits the authentication information to a server.

In addition, according to the present invention, there is provided a processing apparatus including an authentication information acquisition unit that acquires authentication information including at least one of biometric information repeatedly acquired from a service provider or the customer heading toward an appointment location, and a result of biometric authentication based on the biometric information, and an authentication information transmission unit that transmits the authentication information to a server.

In addition, according to the present invention, there is provided a processing method executed by a computer, the processing method including an authentication information acquisition step of acquiring authentication information including at least one of biometric information repeatedly acquired from a service provider or the customer heading toward an appointment location, and a result of biometric authentication based on the biometric information, and an authentication information transmission step of transmitting the authentication information to a server.

Advantageous Effects of Invention

According to the present invention, occurrence of trouble that a person impersonating a service provider meets a customer can be reduced.

BRIEF DESCRIPTION OF THE DRAWINGS

The above object and other objects, features, and advantages will become more apparent from the following description of preferred example embodiments and the following drawings appended thereto.

FIG. 7 is a diagram schematically illustrating one example of information processed by the server of the present example embodiment.

DESCRIPTION OF EMBODIMENTS

First Example Embodiment

"Overview and Summary of System"

First, an overview and a summary of a system of the present example embodiment will be described using the function block diagram of FIG. 1. The system of the present example embodiment is used in a service in which a service provider who receives a request from a customer meets the customer in a predetermined appointment location and performs a predetermined work.

For example, the service is illustrated by, but not limited to, a taxi service in which the customer rides on a moving object such as a car driven by the service provider and moves to a predetermined location from the appointment location, a delivery service in which the service provider receives baggage from the customer in the appointment location and transports the baggage to the predetermined location, or delivers baggage to the customer in the appointment location, and a car sharing service in which the service provider brings the moving object such as the car to the appointment location and delivers the moving object to the customer in the appointment location.

Figure 1:
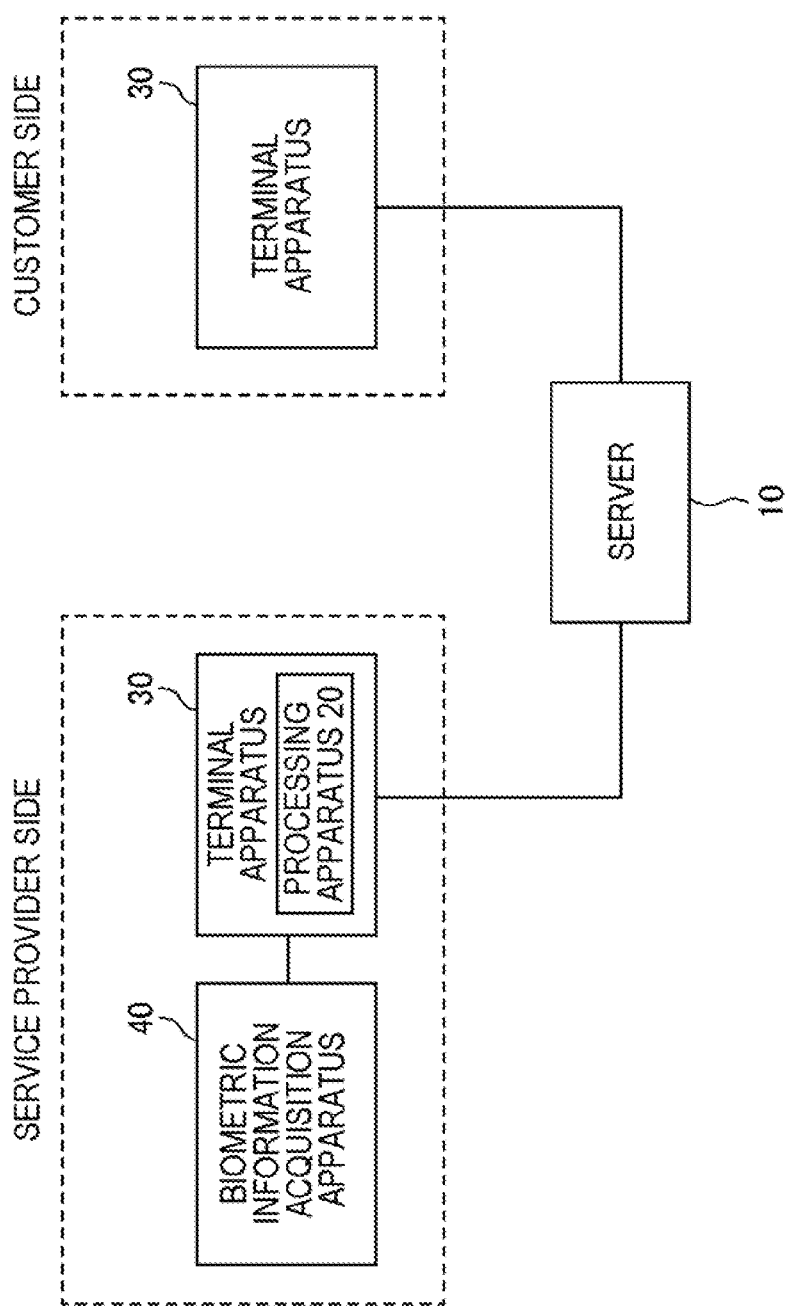
FIG. 1 is one example of a function block diagram of a system of the present example embodiment.

As illustrated in FIG. 1, the system of the present example embodiment includes a server 10, a terminal apparatus 30 on the service provider side, and the terminal apparatus 30 on the customer side. A biometric information acquisition apparatus 40 is connected to the terminal apparatus 30 on the service provider side in a wired and/or wireless manner. The terminal apparatus 30 may include the biometric information acquisition apparatus 40 or may be the biometric information acquisition apparatus 40. The server 10 and the terminal apparatus 30 can communicate with each other through a communication network such as the Internet.

The terminal apparatus 30 is illustrated by, but not limited to, a portable terminal or a wearable terminal such as a smartphone, a tablet terminal, a mobile phone, a personal computer, and a smart watch. For example, the terminal apparatus 30 may be an item of a transportation apparatus (for example, a vehicle, an automobile, a motorcycle, a bicycle, a train, a bus, a handcart, a rickshaw, a ship and other watercraft, an airplane, a rocket, an artificial satellite, a drone, or a hot-air balloon). A program (application) for implementing a function of a processing apparatus 20 is installed on the terminal apparatus 30 on the service provider side.

An overview of a flow of processing of the system of the present example embodiment is as follows. The biometric information acquisition apparatus 40 repeatedly acquires biometric information from the service provider who heads toward the appointment location for the customer. Any of the server 10, the processing apparatus 20, and the biometric information acquisition apparatus 40 repeatedly performs biometric authentication based on biometric information of the real service provider registered in advance and the biometric information acquired by the biometric information acquisition apparatus 40. The server 10 transmits a result of the biometric authentication of the service provider to the terminal apparatus 30 on the customer side.

According to the system of the present example embodiment, based on information notified from the server 10, for example, the customer can recognize that the real service provider is heading toward the appointment location, or that a person who impersonates the real service provider is heading toward the appointment location.

Figure 2:
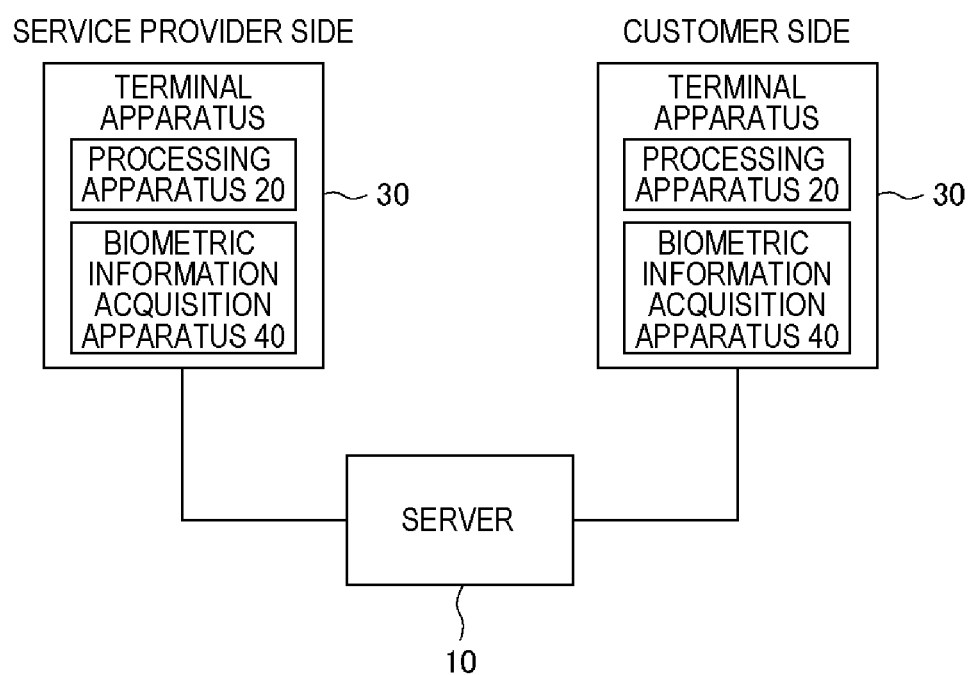
FIG. 2 is one example of the function block diagram of the system of the present example embodiment.

FIG. 2 illustrates a modification example of the function block diagram of the system of the present example embodiment. In the modification example, the terminal apparatus 30 on the service provider side includes the biometric information acquisition apparatus 40, and the biometric information acquisition apparatus 40 is not externally connected to the terminal apparatus 30 on the service provider side.

"One Example of Functional Configuration and Flow of Processing of Terminal Apparatus 30 on Service Provider Side"

Next, one example of a functional configuration and a flow of processing of the terminal apparatus 30 on the service provider side will be described. A program (application) for implementing a function of a processing apparatus 20 is installed on the terminal apparatus 30 on the service provider side. The service provider installs the application on the terminal apparatus 30 of the service provider and then, starts the application and performs registration processing for issuing a user ID of the service provider or registering terminal information in the server 10.

Figure 3:
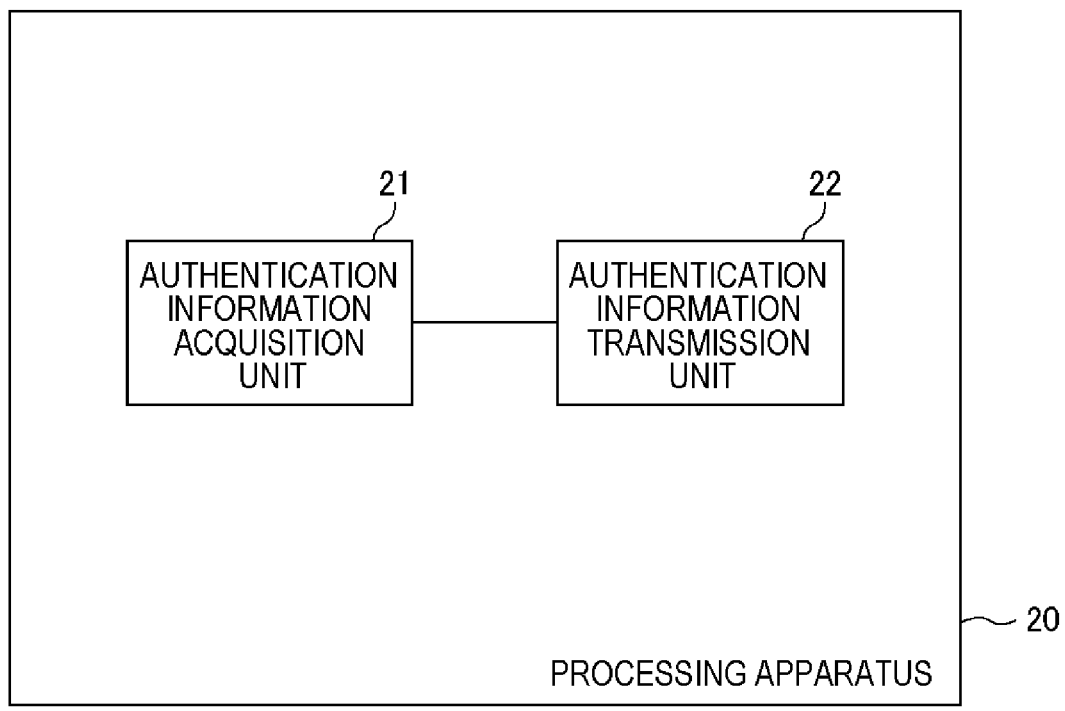
FIG. 3 is one example of a function block diagram of a processing apparatus of the present example embodiment.

FIG. 3 illustrates one example of a function block diagram of the processing apparatus 20. As illustrated, the processing apparatus 20 includes an authentication information acquisition unit 21 and an authentication information transmission unit 22.

The authentication information acquisition unit 21 acquires authentication information that includes at least one of the biometric information repeatedly acquired from the service provider heading toward the appointment location, and the result of the biometric authentication of the service provider that is based on the biometric information. The authentication information transmission unit 22 transmits the authentication information acquired by the authentication information acquisition unit 21 to the server 10.

For example, the authentication information acquisition unit 21 may acquire the biometric information from the biometric information acquisition apparatus 40, which repeatedly acquires the biometric information from the service provider heading toward the appointment location, and acquire the result of the biometric authentication of the service provider by performing the biometric authentication based on the biometric information acquired from the biometric information acquisition apparatus 40 and the biometric information of the real service provider registered in advance. The authentication information transmission unit 22 may transmit the result of the biometric authentication of the service provider to the server 10.

Besides, the authentication information acquisition unit 21 may acquire the biometric information from the biometric information acquisition apparatus 40 which repeatedly acquires the biometric information from the service provider heading toward the appointment location. The authentication information transmission unit 22 may transmit the biometric information to the server 10. In this case, the server 10 acquires the result of the biometric authentication of the service provider by performing the biometric authentication based on the biometric information received from the processing apparatus 20 and the biometric information of the real service provider registered in advance.

Besides, the authentication information acquisition unit 21 may acquire the result of the biometric authentication of the service provider from the biometric information acquisition apparatus 40. The authentication information transmission unit 22 may transmit the result of the biometric authentication of the service provider to the server 10. In this case, the biometric information acquisition apparatus 40 repeatedly acquires the biometric information from the service provider heading toward the appointment location and acquires the result of the biometric authentication of the service provider by performing the biometric authentication based on the acquired biometric information and the biometric information of the real service provider registered in advance.

For example, the biometric information acquisition apparatus 40 may include an earphone and acquire acoustic characteristics of an auditory system as the biometric information. Besides, the biometric information acquisition apparatus 40 may include a fingerprint sensor and acquire a fingerprint as the biometric information. Besides, the biometric information acquisition apparatus 40 may include a camera and acquire an iris image or a face image as the biometric information. Besides, the biometric information acquisition apparatus 40 may include a microphone and acquire a voiceprint as the biometric information. Note that above all else, it is preferable to acquire the acoustic characteristics of the auditory system that can be repeatedly acquired without causing the service provider in movement to feel burdened or be aware of the acquisition.

The biometric information acquisition apparatus 40 starts/finishes biometric information acquisition processing under control of the authentication information acquisition unit 21. For example, the authentication information acquisition unit 21 may receive a user input indicating a start of movement to the appointment location and input information for starting the biometric information acquisition processing into the biometric information acquisition apparatus 40 in response to the user input. The authentication information acquisition unit 21 may receive a user input indicating meeting or the like with the customer and input information for finishing the biometric information acquisition processing into the biometric information acquisition apparatus 40.

Besides, in a case where the user input indicating the start of movement to the appointment location is received, the authentication information acquisition unit 21 may notify the server 10 of the user input. In a case where a request to start the biometric authentication transmitted from the server 10 in response to the notification is received, the authentication information acquisition unit 21 may input the information for starting the biometric information acquisition processing into the biometric information acquisition apparatus 40. In addition, the authentication information acquisition unit 21 may notify the server 10 in a case where the user input indicating meeting or the like with the customer is received. In a case where a request to finish the biometric authentication transmitted from the server 10 in response to the notification is received, the authentication information acquisition unit 21 may input the information for finishing the biometric information acquisition processing into the biometric information acquisition apparatus 40.

Acquisition of the biometric information from the "service provider heading toward the appointment location" is implemented by controlling the start/finish of the biometric information acquisition processing by the biometric information acquisition apparatus 40 in the above manner.

In addition, the biometric information acquisition apparatus 40 can implement processing of repeatedly acquiring the biometric information, by performing surveillance of reaching of a biometric information acquisition timing and acquiring the biometric information at each detection of reaching of the timing during execution of the biometric information acquisition processing. The biometric information acquisition timing may be per predetermined time period (example: per minute), a timing at which a request is received from the server 10, or others.

Figure 4:
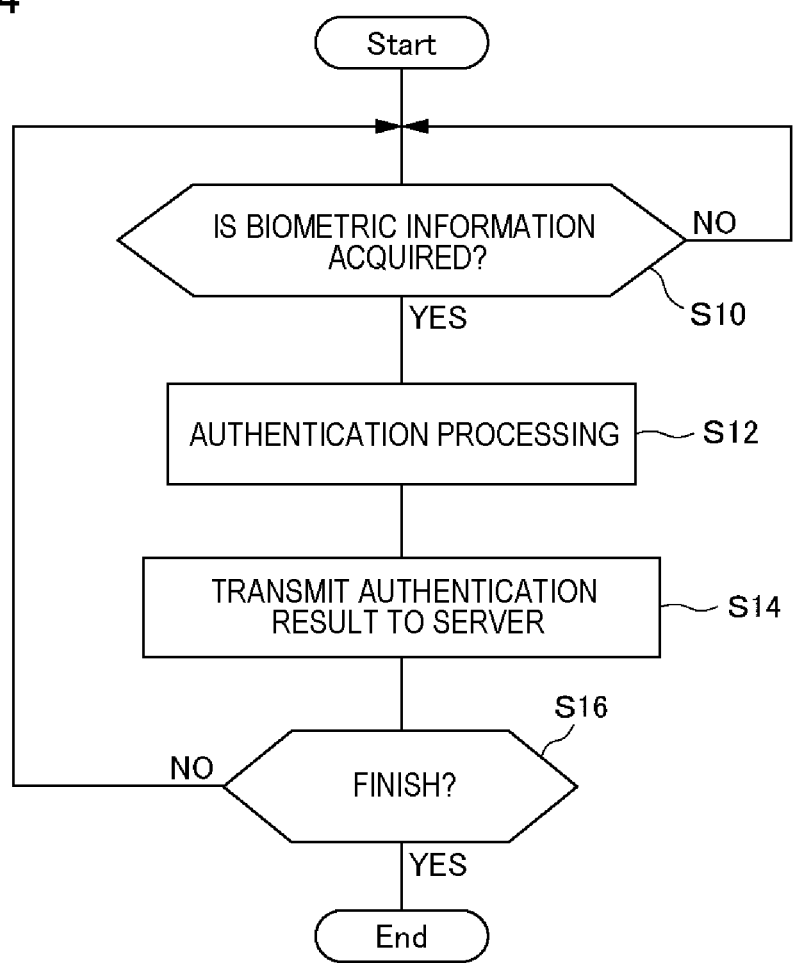
FIG. 4 is a flowchart illustrating one example of a flow of processing of the processing apparatus of the present example embodiment.

One example of a flow of processing of the processing apparatus 20 will be described using the flowchart of FIG. 4. An example in which the processing apparatus 20 performs the biometric authentication will be described.

First, the service provider who starts moving to the appointment location for the customer starts a predetermined application (processing apparatus 20) by operating the terminal apparatus 30 and provides the input indicating the start of movement. Note that the service provider may provide the input indicating the start of movement by specifying one of a plurality of works (tasks) of meeting with a plurality of the customers, respectively.

Then, the processing apparatus 20 transmits, to the server 10, a movement start notification that is linked to the user ID (user ID registered in the application which has started) of the service provider, a task ID, or the like. The server 10 transmits the request to start the biometric authentication to the processing apparatus 20 in response to the notification. Then, the processing apparatus 20 inputs the information for starting the biometric information acquisition processing into the biometric information acquisition apparatus 40 in response to reception of the request to start the biometric authentication.

The biometric information acquisition apparatus 40 starts the biometric information acquisition processing in response to the input of the information for starting the biometric information acquisition processing. Specifically, the biometric information acquisition apparatus 40 executes processing of performing surveillance of the biometric information acquisition timing and acquiring the biometric information at each detection of reaching of the biometric information acquisition timing during execution of the biometric information acquisition processing. The biometric information acquisition apparatus 40 inputs the acquired biometric information into the processing apparatus 20.

In a case where the biometric information is acquired from the biometric information acquisition apparatus 40 (Yes in S10), the processing apparatus 20 performs the biometric authentication based on the biometric information acquired from the biometric information acquisition apparatus 40 and the biometric information of the real service provider registered in advance in the processing apparatus 20 (S12). The processing apparatus 20 links the result of the biometric authentication of the service provider to the user ID of the service provider and transmits the result to the server 10 (S14). Then, the same processing is repeated in a case where an input for finishing the processing (the user input indicating meeting with the customer, an input for finishing the application, or the like) is not provided (No in S16).

Figure 5:
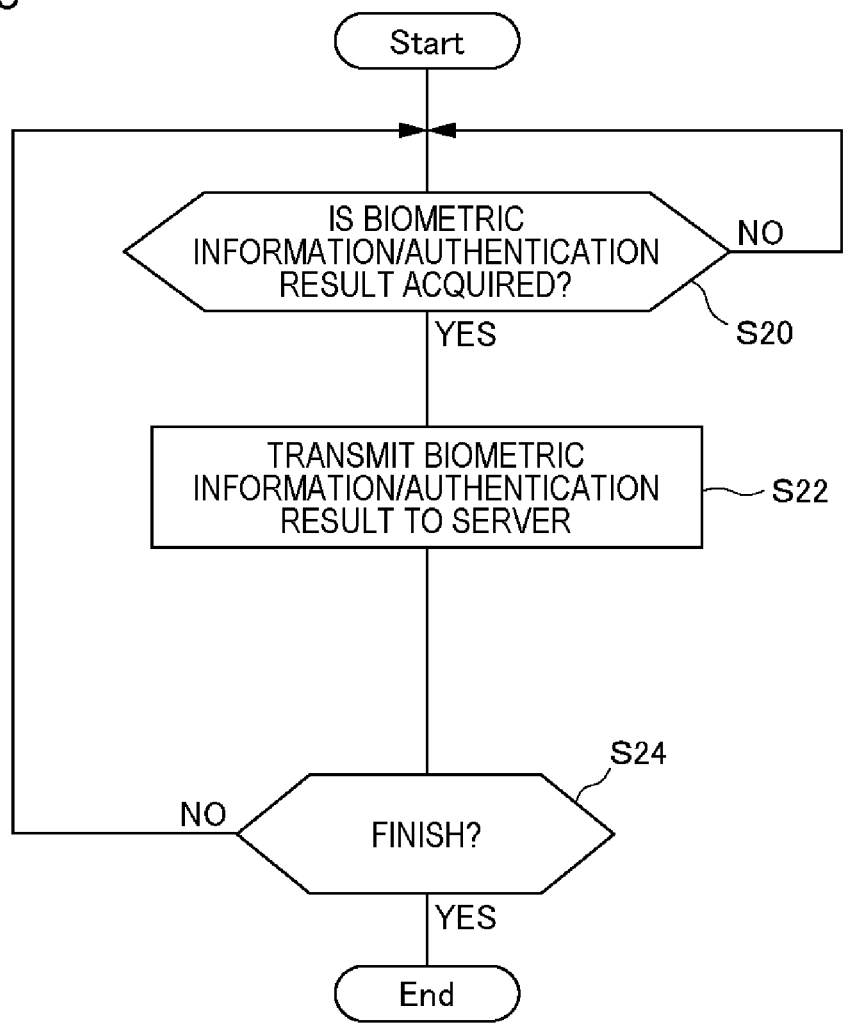
FIG. 5 is a flowchart illustrating one example of the flow of processing of the processing apparatus of the present example embodiment.

Next, another example of the flow of processing of the processing apparatus 20 will be described using the flowchart of FIG. 5. An example in which the server 10 performs the biometric authentication will be described.

First, the service provider who starts moving to the appointment location for the customer starts the predetermined application (processing apparatus 20) by operating the terminal apparatus 30 and provides the input indicating the start of movement. Note that the service provider may provide the input indicating the start of movement by specifying one of the plurality of works (tasks) of meeting with the plurality of customers, respectively.

Then, the processing apparatus 20 transmits, to the server 10, the movement start notification which is linked to the user ID (user ID registered in the application which has started) of the service provider, the task ID, or the like. The server 10 transmits the request to start the biometric authentication to the processing apparatus 20 in response to the notification. Then, the processing apparatus 20 inputs the information for starting the biometric information acquisition processing into the biometric information acquisition apparatus 40 in response to reception of the request to start the biometric authentication.

The biometric information acquisition apparatus 40 starts the biometric information acquisition processing in response to the input of the information for starting the biometric information acquisition processing. Specifically, the biometric information acquisition apparatus 40 executes processing of performing surveillance of the biometric information acquisition timing and acquiring the biometric information at each detection of reaching of the biometric information acquisition timing during execution of the biometric information acquisition processing. The biometric information acquisition apparatus 40 inputs the acquired biometric information into the processing apparatus 20.

In a case where the biometric information is acquired from the biometric information acquisition apparatus 40 (Yes in S20), the processing apparatus 20 links the acquired biometric information to the user ID of the service provider and transmits the biometric information to the server 10 (S22). Then, the same processing is repeated in a case where the input for finishing the processing (the user input indicating meeting with the customer, the input for finishing the application, or the like) is not provided (No in S24).

Next, another example of the flow of processing of the processing apparatus 20 will be described using the flowchart of FIG. 5. An example in which the biometric information acquisition apparatus 40 performs the biometric authentication will be described.

First, the service provider who starts moving to the appointment location for the customer starts the predetermined application (processing apparatus 20) by operating the terminal apparatus 30 and provides the input indicating the start of movement. Note that the service provider may provide the input indicating the start of movement by specifying one of the plurality of works (tasks) of meeting with the plurality of customers, respectively.

Then, the processing apparatus 20 transmits, to the server 10, the movement start notification which is linked to the user ID (user ID registered in the application which has started) of the service provider, the task ID, or the like. The server 10 transmits the request to start the biometric authentication to the processing apparatus 20 in response to the notification. Then, the processing apparatus 20 inputs the information for starting the biometric information acquisition processing into the biometric information acquisition apparatus 40 in response to reception of the request to start the biometric authentication.

The biometric information acquisition apparatus 40 starts the biometric information acquisition processing in response to the input of the information for starting the biometric information acquisition processing. Specifically, the biometric information acquisition apparatus 40 executes processing of performing surveillance of the biometric information acquisition timing and acquiring the biometric information at each detection of reaching of the biometric information acquisition timing during execution of the biometric information acquisition processing. The biometric information acquisition apparatus 40 performs the biometric authentication based on the acquired biometric information and the biometric information of the real service provider registered in advance in the biometric information acquisition apparatus 40. The biometric information acquisition apparatus 40 inputs the result of the biometric authentication of the service provider into the processing apparatus 20.

In a case where the result of the biometric authentication of the service provider is acquired from the biometric information acquisition apparatus 40 (Yes in S20), the processing apparatus 20 links the acquired result of the biometric authentication of the service provider to the user ID of the service provider and transmits the result to the server 10 (S22). Then, the same processing is repeated in a case where the input for finishing the processing (the user input indicating meeting with the customer, the input for finishing the application, or the like) is not provided (No in S24).

"One Example of Functional Configuration and Flow of Processing of Server 10"

Figure 6:
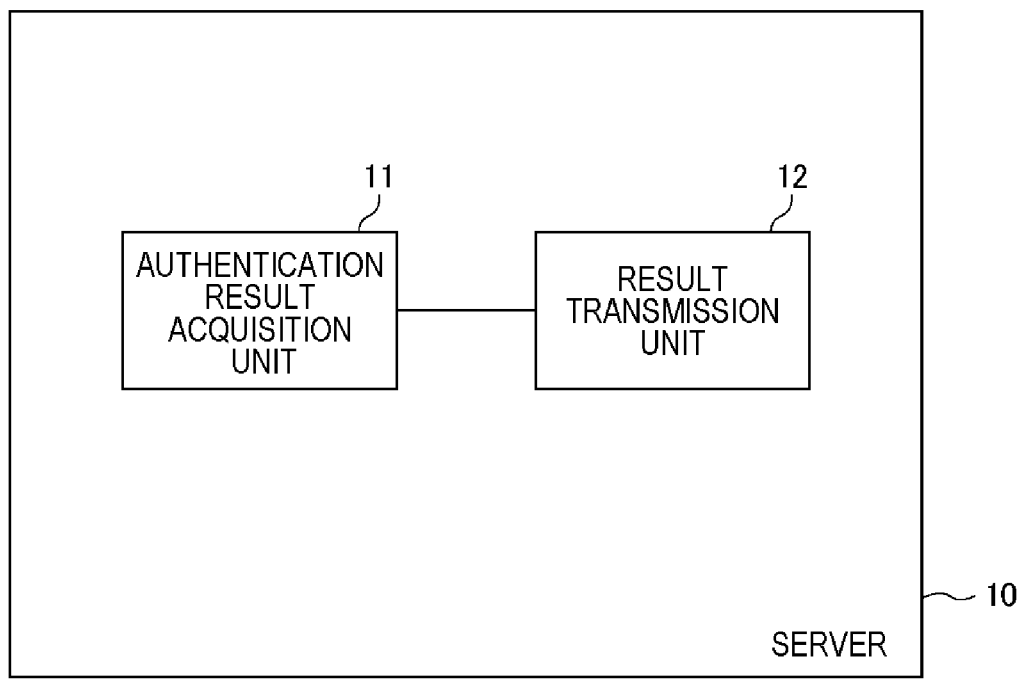
FIG. 6 is one example of a function block diagram of a server of the present example embodiment.

Next, one example of a functional configuration and a flow of processing of the server 10 will be described. FIG. 6 illustrates one example of a function block diagram of the server 10. As illustrated, the server 10 includes an authentication result acquisition unit 11 and a result transmission unit 12.

The authentication result acquisition unit 11 acquires the result of the biometric authentication of the service provider which is based on the biometric information repeatedly acquired from the service provider heading toward the appointment location for the customer.

For example, the authentication result acquisition unit 11 may acquire the result of the biometric authentication of the service provider transmitted from the processing apparatus 20. Besides, the authentication result acquisition unit 11 may acquire the result of the biometric authentication of the service provider by performing the biometric authentication based on the biometric information of the service provider transmitted from the processing apparatus 20 and the biometric information of the real service provider registered in advance.

The result transmission unit 12 transmits the result of the biometric authentication of the service provider, which is acquired by the authentication result acquisition unit 11, to the terminal apparatus 30 on the customer side. The result transmission unit 12 can transmit the result of the biometric authentication of the service provider to the terminal apparatus 30 on the customer side by any scheme such as push notification of the application and transmission of an electronic mail to a mail address of the customer registered in advance.

Note that the server 10 can manage a content of each task as illustrated in FIG. 7. For example, the server 10 may manage the "task ID" in association with a "service provider ID", a "customer ID", the "appointment location", an "appointment time", a "departure flag indicating that the service provider starts moving to the appointment location", a "completion flag indicating that the service provider meets the customer", and the like.

By checking the "departure flag indicating that the service provider starts moving to the appointment location" and the "completion flag indicating that the service provider meets the customer", the result transmission unit 12 can determine whether or not the service provider is executing movement to the appointment location, a customer for which the service provider is moving to the appointment location, and the like. Based on information illustrated in FIG. 7, the result transmission unit 12 can decide a customer side on which the result of the biometric authentication of the service provider acquired by the authentication result acquisition unit 11 is to be transmitted to the terminal apparatus 30. For example, in a case where it is determined that the service provider of a service provider ID "D02111" is moving to the appointment location for the customer of a customer ID "C00028", the result transmission unit 12 transmits the result of the biometric authentication of the service provider to the terminal apparatus 30 of the customer of the customer ID "C00028".

Figure 8:
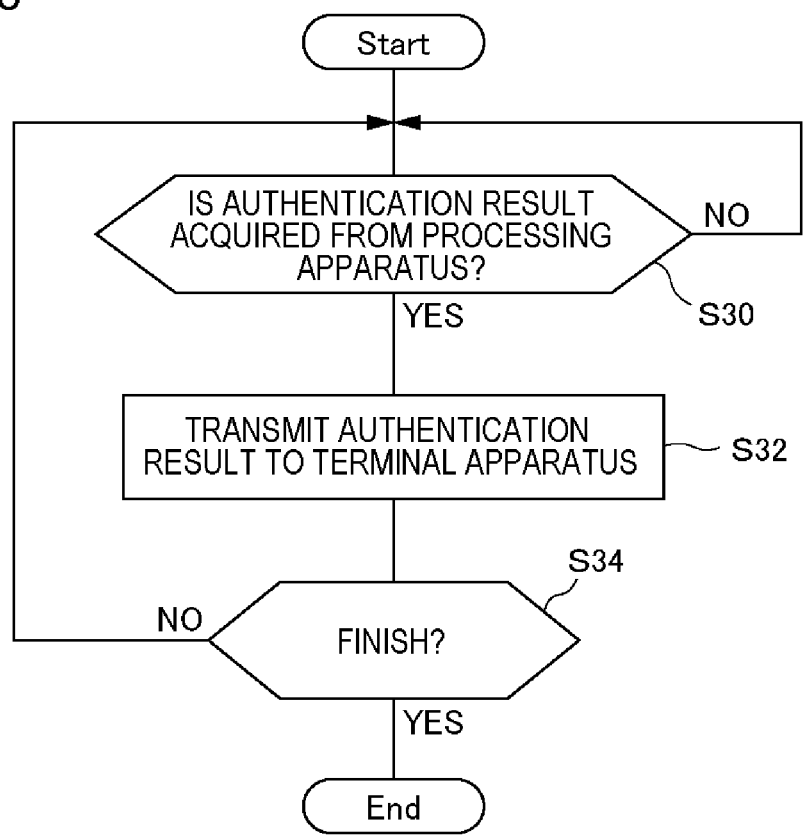
FIG. 8 is a flowchart illustrating one example of a flow of processing of the server of the present example embodiment.

One example of a flow of processing of the server 10 will be described using the flowchart of FIG. 8. An example in which the processing apparatus 20 or the biometric information acquisition apparatus 40 performs the biometric authentication will be described.

In a case where the result of the biometric authentication of the service provider linked to the user ID of the service provider is acquired from the processing apparatus 20 (Yes in S30), the server 10 transmits the result of the biometric authentication of the service provider to the terminal apparatus 30 of the customer who is determined based on the user ID of the service provider and management information or the like illustrated in FIG. 7 (S32). Then, the same processing is repeated in a case where the input for finishing the processing is not provided (No in S34).

Figure 9:
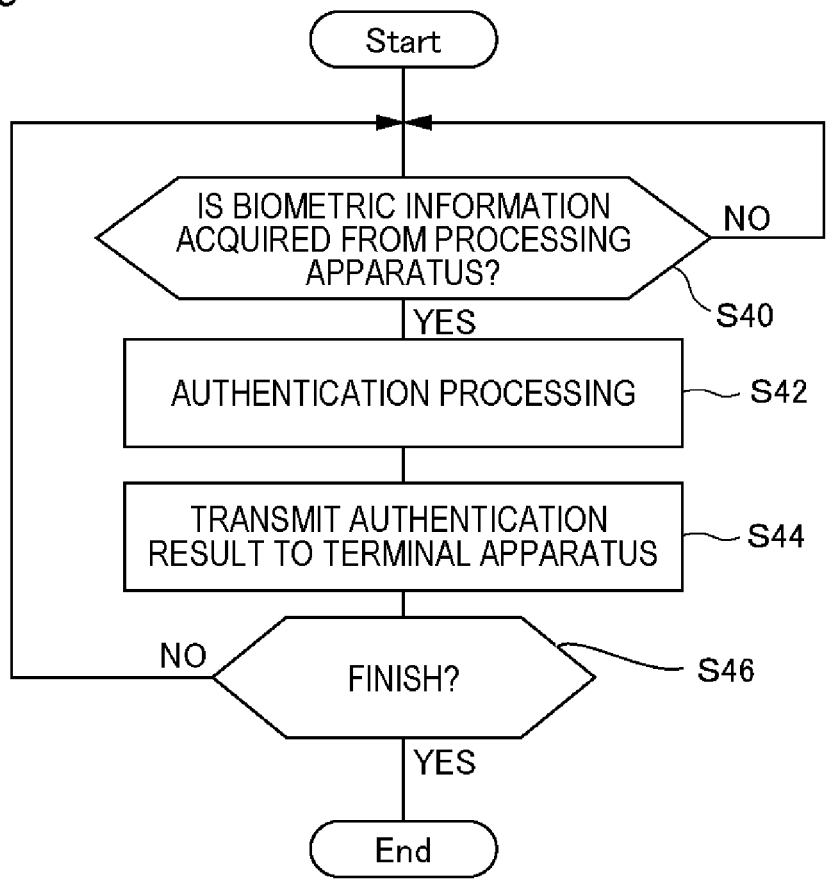
FIG. 9 is a flowchart illustrating one example of the flow of processing of the server of the present example embodiment.

Next, one example of the flow of processing of the server 10 will be described using the flowchart of FIG. 9. An example in which the server 10 performs the biometric authentication will be described.

In a case where the biometric information of the service provider linked to the user ID of the service provider is acquired from the processing apparatus 20 (Yes in S40), the server 10 performs the biometric authentication based on the biometric information of the service provider and reference biometric information that is linked to the user ID of the service provider and registered in advance (S42). The server 10 transmits the result of the biometric authentication of the service provider to the terminal apparatus 30 of the customer determined based on the user ID of the service provider and the management information or the like illustrated in FIG. 7 (S44). Then, the same processing is repeated in a case where the input for finishing the processing is not provided (No in S46).

"Hardware Configuration of Server 10 and Terminal Apparatus 30"

Next, one example of a hardware configuration of the server 10 and the terminal apparatus 30 will be described. Each function unit included in the server 10 and the terminal apparatus 30 of the present example embodiment is implemented by any combination of hardware and software that is mainly based on a central processing unit (CPU) of any computer, a memory, a program loaded into the memory, a storage unit (capable of storing not only the program stored in advance from a shipping stage of the apparatus but also the program downloaded from a storage medium such as a compact disc (CD) or a server or the like on the Internet) such as a hard disk storing the program, and an interface for network connection. Those skilled in the art will perceive various modification examples of an implementation method and the apparatus.

Figure 10:
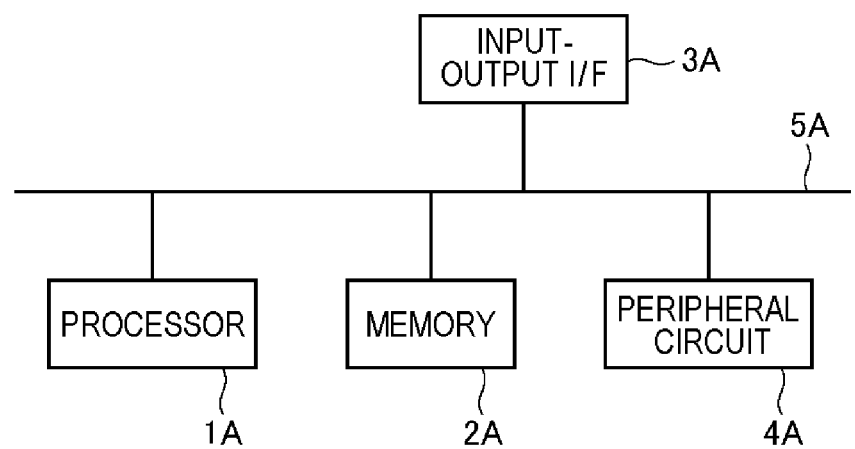
FIG. 10 is a diagram illustrating one example of a hardware apparatus configuration of the present example embodiment.

FIG. 10 is a block diagram illustrating the hardware configuration of the server 10 and the terminal apparatus 30 of the present example embodiment. As illustrated in FIG. 10, each of the server 10 and the terminal apparatus 30 includes a processor 1A, a memory 2A, an input-output interface 3A, a peripheral circuit 4A, and a bus 5A. The peripheral circuit 4A includes various modules. Each of the server 10 and the terminal apparatus 30 may not include the peripheral circuit 4A. Note that each of the server 10 and the terminal apparatus 30 may be configured with a plurality of physically separated apparatuses. In this case, each of the plurality of apparatuses can have the hardware configuration.

The bus 5A is a data transfer path for transmitting and receiving data among the processor 1A, the memory 2A, the peripheral circuit 4A, and the input-output interface 3A. The processor 1A is a calculation processing apparatus such as a CPU or a graphics processing unit (GPU). The memory 2A is a memory such as a random access memory (RAM) or a read only memory (ROM). The input-output interface 3A includes, for example, an interface for acquiring information from an input apparatus, an external apparatus, an external server, an external sensor, a camera, and the like, an interface for outputting information to an output apparatus, the external apparatus, the external server, and the like. For example, the input apparatus is a keyboard, a mouse, or a microphone. For example, the output apparatus is a display, a speaker, a printer, or a mailer. The processor 1A can output an instruction to each module and perform calculation based on a calculation result of each module.

"Advantageous Effect"

According to the system of the present example embodiment described above, in the service in which the service provider receiving the request from the customer meets the customer in the predetermined appointment location and performs the predetermined work, it is possible to repeatedly execute the biometric authentication on the service provider who is moving toward the appointment location, and notify the customer of the result of the biometric authentication.

According to the system of the present example embodiment, based on information notified from the system, for example, the customer can recognize that the real service provider is heading toward the appointment location, or that the person who impersonates the real service provider is heading toward the appointment location. Consequently, the customer can avoid, in advance, inconvenience of meeting the person impersonating the real service provider in the appointment location.

Second Example Embodiment

"Overview and Summary of System"

A system of the present example embodiment is different from the first example embodiment in that the result of the biometric authentication of the service provider is transmitted to the customer only in a case where a predetermined condition is satisfied. Other overviews and summaries of the system are the same as the first example embodiment.

"One Example of Functional Configuration and Flow of Processing of Terminal Apparatus 30 on Service Provider Side"

One example of the functional configuration and the flow of processing of the terminal apparatus 30 on the service provider side is the same as the first example embodiment. In addition, one example of the functional configuration and the flow of processing of the biometric information acquisition apparatus 40 is the same as the first example embodiment.

"One Example of Functional Configuration and Flow of Processing of Server 10"

One example of the function block diagram of the server 10 is illustrated in FIG. 6 in the same manner as the first example embodiment. As illustrated, the server 10 includes the authentication result acquisition unit 11 and the result transmission unit 12. A configuration of the authentication result acquisition unit 11 is the same as the first example embodiment.

In a case where the result of the biometric authentication of the service provider indicates authentication failure, the result transmission unit 12 transmits the result of the biometric authentication of the service provider to the terminal apparatus 30 on the customer side. On the other hand, in a case where the result of the biometric authentication of the service provider indicates authentication success, the result transmission unit 12 does not transmit the result of the biometric authentication of the service provider to the terminal apparatus 30 on the customer side. Other configurations of the result transmission unit 12 are the same as the first example embodiment.

Figure 11:
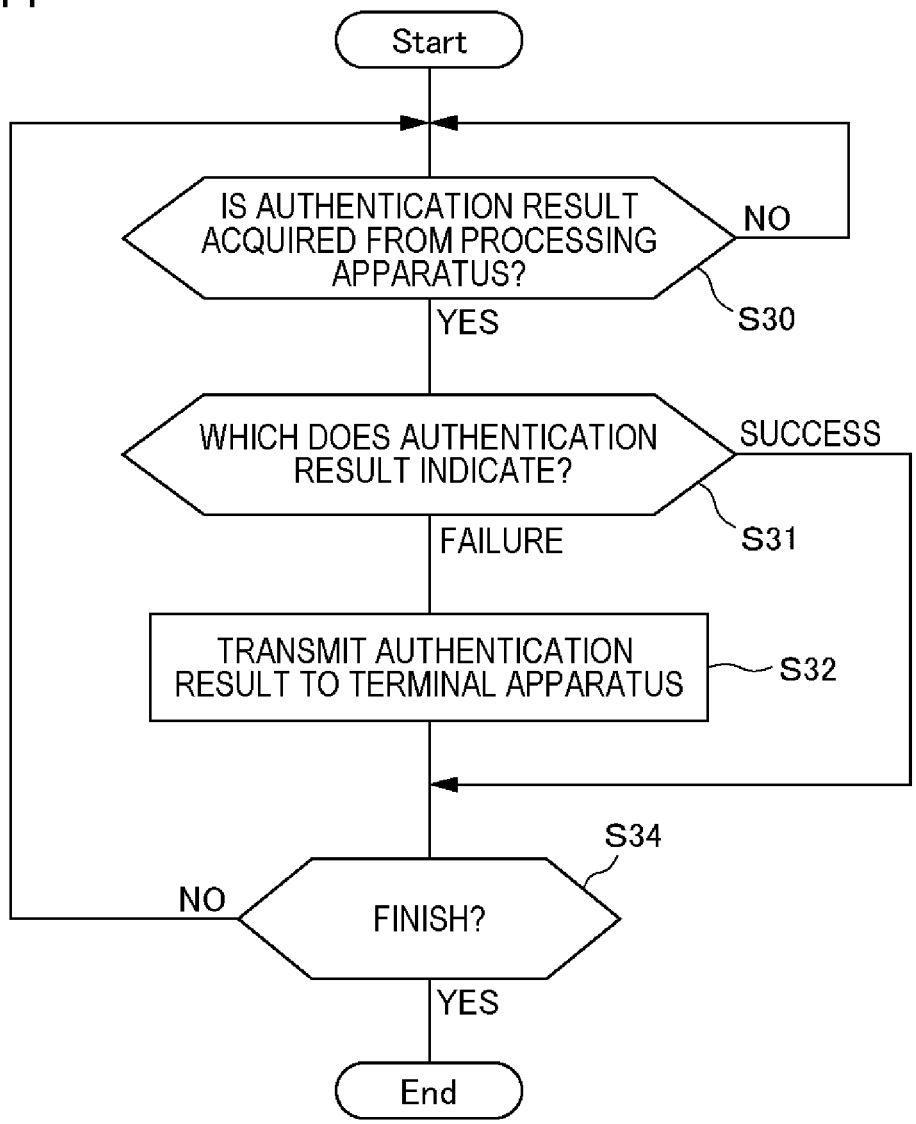
FIG. 11 is a flowchart illustrating one example of the flow of processing of the server of the present example embodiment.

One example of the flow of processing of the server 10 of the present example embodiment is illustrated in the flowchart of FIG. 11. In a case where the flowchart of FIG. 11 is compared with the flowchart of FIG. 8 described in the first example embodiment, there is a difference in that in a case of Yes in S30, processing (S31) of checking whether the acquired result of the biometric authentication of the service provider indicates the authentication success or the authentication failure is executed before S32, and that a transition is made to S32 in a case of the authentication failure and a transition is made to S34 in a case of the authentication success.

Figure 12:
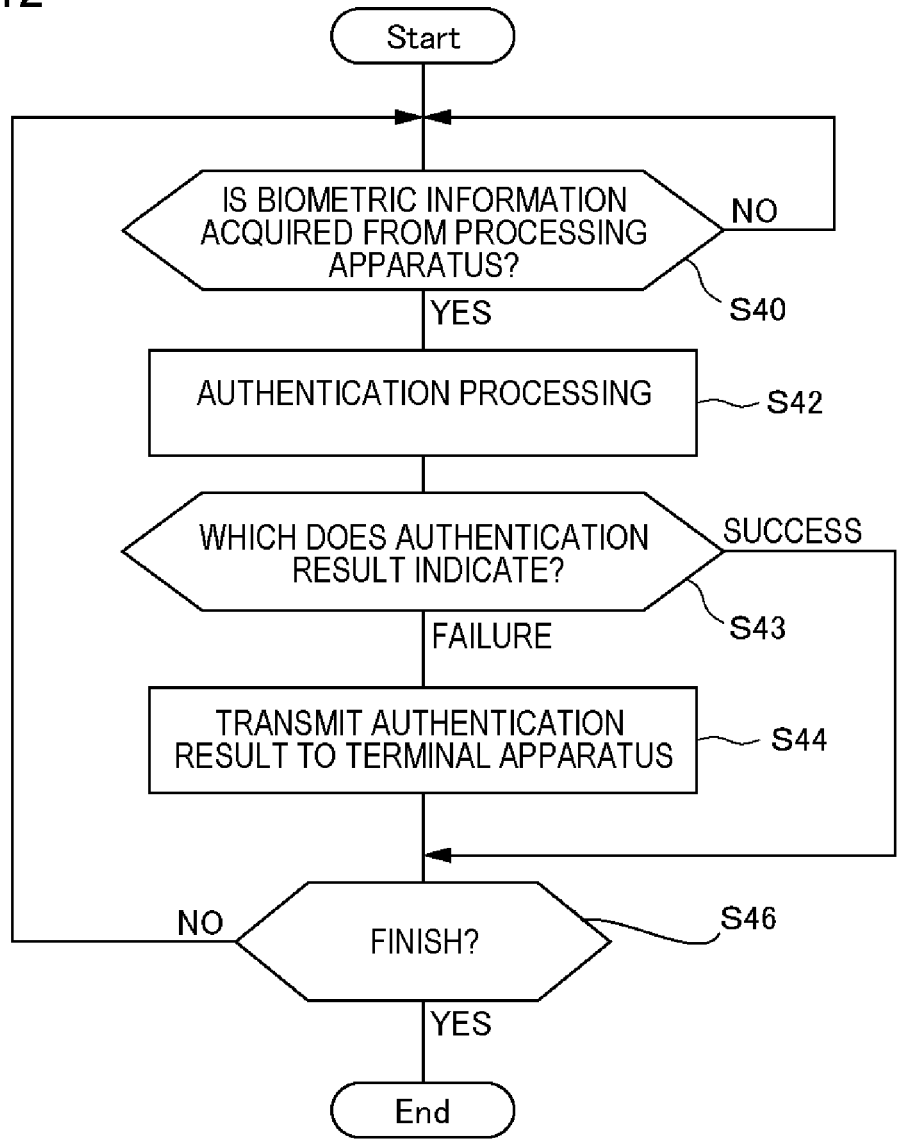
FIG. 12 is a flowchart illustrating one example of the flow of processing of the server of the present example embodiment.

Another example of the flow of processing of the server 10 of the present example embodiment is illustrated in the flowchart of FIG. 12. In a case where the flowchart of FIG. 12 is compared with the flowchart of FIG. 9 described in the first example embodiment, there is a difference in that after S42 and before S44, processing (S43) of checking whether the result of the biometric authentication in S42 indicates the authentication success or the authentication failure is executed, and that a transition is made to S44 in a case of the authentication failure and a transition is made to S46 in a case of the authentication success.

"Hardware Configuration of Server 10 and Terminal Apparatus 30"

One example of the hardware configuration of the server 10 and the terminal apparatus 30 of the present example embodiment is the same as the first example embodiment.

"Advantageous Effect"

According to the system of the present example embodiment described above, the same advantageous effect as the first example embodiment can be implemented. In addition, the system of the present example embodiment is configured to notify the terminal apparatus 30 on the customer side from the server 10 only in a case where the biometric authentication fails, that is, in a case where there is a possibility that any person impersonating the real service provider is heading toward the appointment location. By such a configuration, information to be transmitted and received can be narrowed down to really necessary information. Consequently, reduction of a communication burden, reduction of a processing burden of the server 10, a customer burden due to notification of an unnecessarily large amount of information to the customer, avoidance of inconvenience of overlooking important information due to notification of an unnecessarily large amount of information to the customer, and the like are implemented.

Third Example Embodiment

"Overview and Summary of System"

A system of the present example embodiment is different from the first example embodiment in that the result of the biometric authentication of the service provider is transmitted to the customer only in a case where a predetermined condition is satisfied. Other overviews and summaries of the system are the same as the first example embodiment. Note that while the system of the present example embodiment transmits the result of the biometric authentication of the service provider to the terminal apparatus 30 on the customer side in a case where the result of the biometric authentication of the service provider indicates the authentication failure, an implementation scheme is different from the second example embodiment.

"One Example of Functional Configuration and Flow of Processing of Terminal Apparatus 30 on Service Provider Side"

One example of the function block diagram of the processing apparatus 20 implemented in the terminal apparatus 30 on the service provider side is illustrated in FIG. 3 in the same manner as the first example embodiment. As illustrated, the processing apparatus 20 includes an authentication information acquisition unit 21 and an authentication information transmission unit 22. A configuration of the authentication information acquisition unit 21 is the same as the first and second example embodiments.

The authentication information transmission unit 22 transmits the result of the biometric authentication of the service provider to the server 10 in a case where the result of the biometric authentication of the service provider indicates the authentication failure, and does not transmit the result of the biometric authentication of the service provider to the server 10 in a case where the result of the biometric authentication of the service provider indicates the authentication success. Other configurations of the authentication information transmission unit 22 are the same as the first and second example embodiments.

Figure 13:
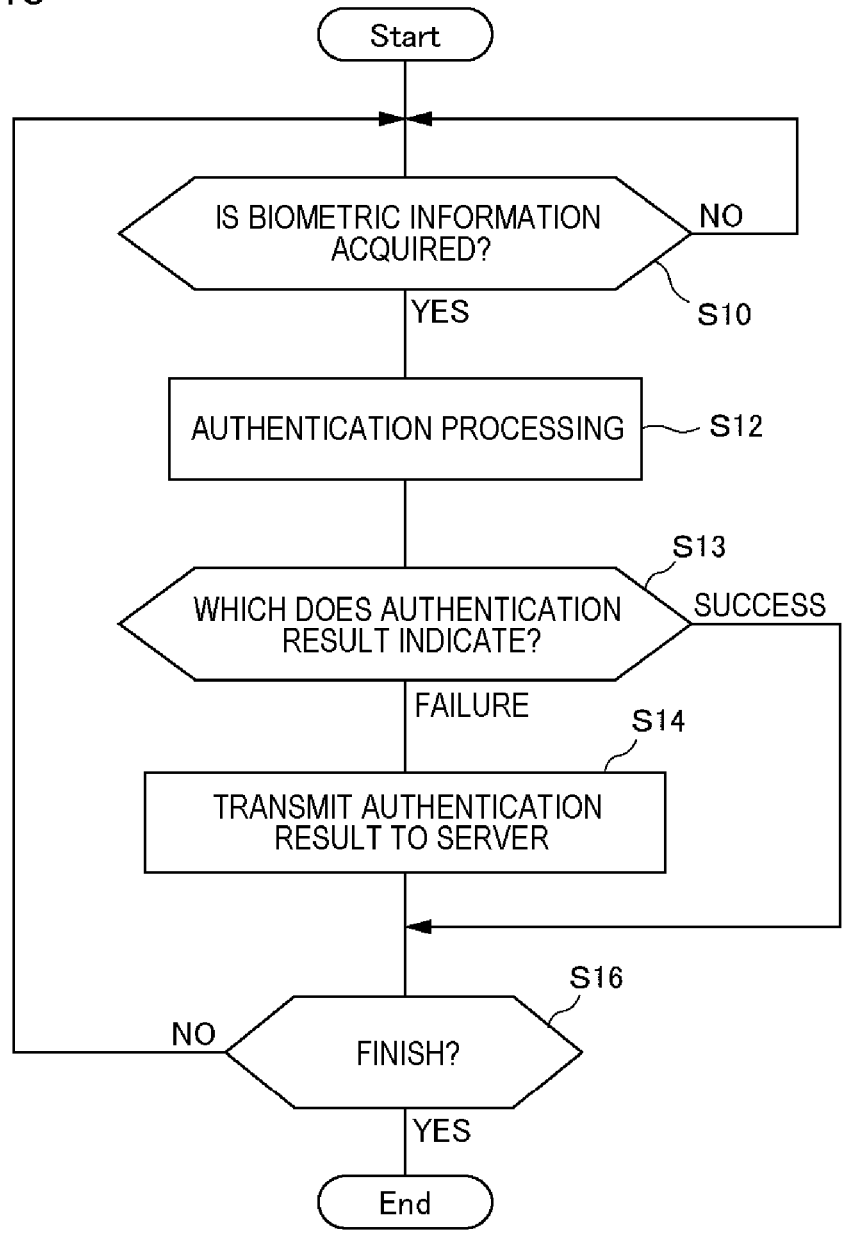
FIG. 13 is a flowchart illustrating one example of the flow of processing of the processing apparatus of the present example embodiment.

One example of the flow of processing of the processing apparatus 20 of the present example embodiment is illustrated in FIG. 13. In a case where the flowchart of FIG. 13 is compared with the flowchart of FIG. 4 described in the first example embodiment, there is a difference in that after S12 and before S14, processing (S13) of checking whether the result of the biometric authentication in S12 indicates the authentication success or the authentication failure is executed, and that a transition is made to S14 in a case of the authentication failure and a transition is made to S16 in a case of the authentication success.

Figure 14:
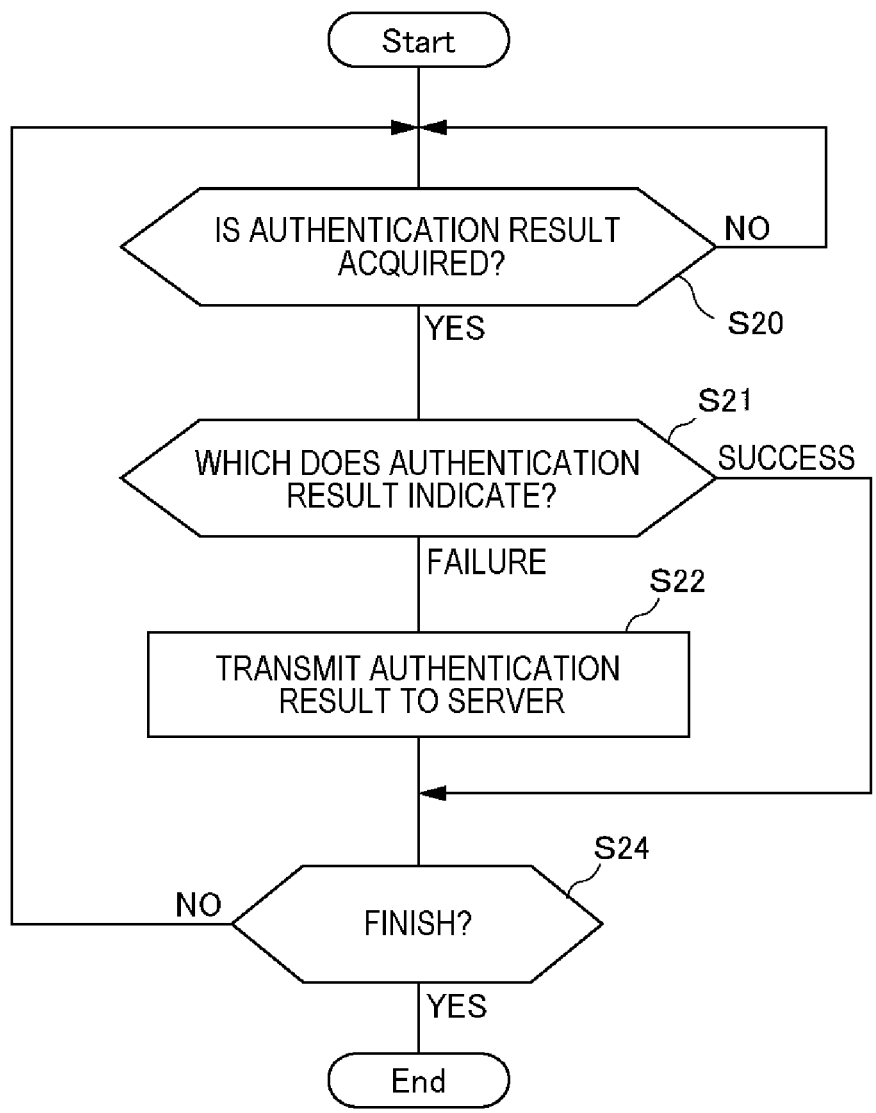
FIG. 14 is a flowchart illustrating one example of the flow of processing of the processing apparatus of the present example embodiment.

Another example of the flow of processing of the processing apparatus 20 of the present example embodiment is illustrated in FIG. 14. In a case where the flowchart of FIG. 14 is compared with the flowchart of FIG. 5 described in the first example embodiment, there is a difference in that in a case of Yes in S20, processing (S21) of checking whether the result of the biometric authentication of the service provider acquired from the biometric information acquisition apparatus 40 indicates the authentication success or the authentication failure is executed before S22, and that a transition is made to S22 in a case of the authentication failure and a transition is made to S24 in a case of the authentication success.

A modification example will be described. In a case where the biometric information acquisition apparatus 40 is configured to execute the biometric authentication of the service provider and transmit the result of the biometric authentication to the processing apparatus 20, the biometric information acquisition apparatus 40 may transmit the result of the biometric authentication of the service provider to the processing apparatus 20 in a case where the result of the biometric authentication of the service provider indicates the authentication failure, and not transmit the result of the biometric authentication of the service provider to the processing apparatus 20 in a case where the result of the biometric authentication of the service provider indicates the authentication success.

"One Example of Functional Configuration and Flow of Processing of Server 10"

One example of the functional configuration and the flow of processing of the server 10 is the same as the first and second example embodiments.

"Advantageous Effect"

According to the system of the present example embodiment described above, the same advantageous effect as the first and second example embodiments can be implemented. In addition, according to the system of the present example embodiment, not only information transmitted to the customer side from the server 10 but also information transmitted to the server 10 from the processing apparatus 20, information transmitted to the processing apparatus 20 from the biometric information acquisition apparatus 40, and the like can be narrowed down. Consequently, further reduction of the communication burden in the entire system of the present example embodiment, reduction of processing burdens of the processing apparatus 20 and the biometric information acquisition apparatus 40, and the like are implemented.

Fourth Example Embodiment

"Overview and Summary of System"

A system of the present example embodiment is different from the first to third example embodiments in that in a case where the service provider is away from the appointment location by a threshold, the result of the biometric authentication of the service provider is transmitted to the customer only in a case where a predetermined condition is satisfied, and that in a case where the service provider is positioned within the threshold value from the appointment location, all acquired results of the biometric authentication of the service provider are transmitted to the customer. Other overviews and summaries of the system are the same as the first to third example embodiments.

"One Example of Functional Configuration and Flow of Processing of Server 10 and Terminal Apparatus 30 on Service Provider Side"

The processing apparatus 20 implemented in the terminal apparatus 30 on the service provider side repeatedly acquires positional information indicating a current position of the processing apparatus 20. The processing apparatus 20 transmits the acquired positional information to the server 10.

A scheme for acquiring the positional information is illustrated by, but not limited to, use of a global positioning system (GPS), use of a communication base station, and the like. For example, until the user input indicating meeting or the like with the customer is received after the user input for starting movement to the appointment location for the customer is received, the processing apparatus 20 performs surveillance of reaching of a positional information acquisition timing and acquires the positional information indicating the current position at each detection of reaching of the timing. The positional information acquisition timing may be per predetermined time period (example: per minute), a timing at which a request is received from the server 10, or others.

In a case where the service provider is positioned within a first standard distance from the appointment location, the result transmission unit 12 of the server 10 transmits the result of the biometric authentication of the service provider to the terminal apparatus 30 on the customer side even in a case where the result of the biometric authentication of the service provider indicates any of the authentication success and the authentication failure. On the other hand, in a case where the service provider is not positioned within the first standard distance from the appointment location, the result transmission unit 12 transmits the result of the biometric authentication of the service provider to the terminal apparatus 30 on the customer side in a case where the result of the biometric authentication of the service provider indicates the authentication failure, and does not transmit the result of the biometric authentication of the service provider to the terminal apparatus 30 on the customer side in a case where the result of the biometric authentication of the service provider indicates the authentication success. The result transmission unit 12 can determine the appointment location for the service provider and the customer based on a notification received from the terminal apparatus 30 on the service provider side or information managed by the server 10 as illustrated in FIG. 7.

Note that the system of the present example embodiment can verify a positional relationship between the service provider and the appointment location using a "position of the processing apparatus 20" as a "position of the service provider".

A modification example applicable to a case where the processing apparatus 20 or the biometric information acquisition apparatus 40 performs the biometric authentication of the service provider will be described. In a case where the service provider is positioned within the first standard distance from the appointment location, the authentication information transmission unit 22 of the processing apparatus 20 transmits the result of the biometric authentication of the service provider to the server 10 even in a case where the result of the biometric authentication of the service provider indicates any of the authentication success and the authentication failure. On the other hand, in a case where the service provider is not positioned within the first standard distance from the appointment location, the authentication information transmission unit 22 transmits the result of the biometric authentication to the server 10 in a case where the result of the biometric authentication indicates the authentication failure, and does not transmit the result of the biometric authentication to the server 10 in a case where the result of the biometric authentication indicates the authentication success. Note that the processing apparatus 20 may acquire information indicating the appointment location from the server 10.

Next, another modification example applicable to a case where the biometric information acquisition apparatus 40 performs the biometric authentication of the service provider will be described. In a case where the service provider is positioned within the first standard distance from the appointment location, the biometric information acquisition apparatus 40 transmits the result of the biometric authentication of the service provider to the processing apparatus 20 even in a case where the result of the biometric authentication of the service provider indicates any of the authentication success and the authentication failure. On the other hand, in a case where the service provider is not positioned within the first standard distance from the appointment location, the biometric information acquisition apparatus 40 transmits the result of the biometric authentication to the processing apparatus 20 in a case where the result of the biometric authentication indicates the authentication failure, and does not transmit the result of the biometric authentication to the processing apparatus 20 in a case where the result of the biometric authentication indicates the authentication success. In a case of this modification example, the biometric information acquisition apparatus 40 may acquire information indicating the appointment location and the current position of the processing apparatus 20 from the processing apparatus 20 and verify the positional relationship between the service provider and the appointment location (whether or not the service provider is positioned within the first standard distance from the appointment location) based on the information. Besides, the processing apparatus 20 may verify the positional relationship between the service provider and the appointment location and input a verification result into the biometric information acquisition apparatus 40.

One example of other functional configurations and flows of processing of the server 10 and the terminal apparatus 30 on the service provider side is the same as the first to third example embodiments.

"Hardware Configuration of Server 10 and Terminal Apparatus 30"

One example of the hardware configuration of the server 10 and the terminal apparatus 30 of the present example embodiment is the same as the first to third example embodiments.

"Advantageous Effect"

According to the system of the present example embodiment described above, the same advantageous effect as the first to third example embodiments can be implemented. In addition, according to the system of the present example embodiment, in a case where the service provider is away from the appointment location, that is, in a case where a relatively long time is left before meeting between the service provider and the customer, the terminal apparatus 30 on the customer side is configured to be notified from the server 10 only in a case where the biometric authentication fails. In a case where the service provider is approaching the appointment location, that is, in a case where a timing at which the service provider meets the customer is approaching, all results are configured to be notified to the customer regardless of the result of the biometric authentication of the service provider. According to the system of the present example embodiment, the result of the biometric authentication of the service provider can be notified to the customer by an appropriate scheme corresponding to a situation.

Fifth Example Embodiment

"Overview and Summary of System"

A system of the present example embodiment is different from the first to fourth example embodiments in that a frequency of performing the biometric authentication of the service provider can be changed between a case where the service provider is away from the appointment location by the threshold, and a case where the service provider is not away from the appointment location by the threshold. Other overviews and summaries of the system are the same as the first to fourth example embodiments.

"One Example of Functional Configuration and Flow of Processing of Server 10 and Terminal Apparatus 30 on Service Provider Side"

The processing apparatus 20 implemented in the terminal apparatus 30 on the service provider side repeatedly acquires the positional information indicating the current position of the processing apparatus 20. The processing apparatus 20 transmits the acquired positional information to the server 10. A scheme for acquiring the positional information is described in the fourth example embodiment.

The authentication result acquisition unit 11 of the server 10 performs a control for setting a performance frequency of the biometric authentication of the service provider to be higher in a case where the service provider is positioned within a second standard distance from the appointment location, than in a case where the service provider is not positioned within the second standard distance from the appointment location. For example, the authentication result acquisition unit 11 may implement the control by transmitting an instruction to acquire the biometric information with a specified performance frequency (once per five minutes, once per 15 minutes, or the like) to the biometric information acquisition apparatus 40 through the processing apparatus 20. In this case, the biometric information acquisition apparatus 40 acquires the biometric information with the performance frequency specified in the server 10. The authentication result acquisition unit 11 can determine the appointment location for the service provider and the customer based on the notification received from the terminal apparatus 30 on the service provider side or the information managed by the server 10 as illustrated in FIG. 7.

Note that the system of the present example embodiment can verify the positional relationship between the service provider and the appointment location using the "position of the processing apparatus 20" as the "position of the service provider".

A modification example will be described. The control may be performed by the processing apparatus 20 instead of the server 10. That is, in the modification example, the authentication information acquisition unit 21 of the processing apparatus 20 performs the control for setting the performance frequency of the biometric authentication to be higher in a case where the service provider is positioned within the second standard distance from the appointment location, than in a case where the service provider is not positioned within the second standard distance from the appointment location. For example, the authentication information acquisition unit 21 may implement the control by transmitting the instruction to acquire the biometric information with the specified performance frequency (once per five minutes, once per 15 minutes, or the like) to the biometric information acquisition apparatus 40. In this case, the biometric information acquisition apparatus 40 acquires the biometric information with the performance frequency specified in the processing apparatus 20. The authentication information acquisition unit 21 may acquire the information indicating the appointment location from the server 10.

Another modification example will be described. The control may be performed by the biometric information acquisition apparatus 40. That is, in the modification example, the biometric information acquisition apparatus 40 performs the control for setting the performance frequency of the biometric authentication to be higher in a case where the service provider is positioned within the second standard distance from the appointment location, than in a case where the service provider is not positioned within the second standard distance from the appointment location. For example, the biometric information acquisition apparatus 40 may perform a control for setting an acquisition frequency of the biometric information to be higher in a case where the service provider is positioned within the second standard distance from the appointment location, than in a case where the service provider is not positioned within the second standard distance from the appointment location. In a case of this modification example, the biometric information acquisition apparatus 40 may acquire the information indicating the appointment location and the current position of the processing apparatus 20 from the processing apparatus 20 and verify the positional relationship between the service provider and the appointment location (whether or not the service provider is positioned within the second standard distance from the appointment location) based on the information. Besides, the processing apparatus 20 may verify the positional relationship between the service provider and the appointment location and input the verification result into the biometric information acquisition apparatus 40.

One example of other functional configurations and flows of processing of the server 10 and the terminal apparatus 30 on the service provider side is the same as the first to fourth example embodiments.

"Hardware Configuration of Server 10 and Terminal Apparatus 30"

One example of the hardware configuration of the server 10 and the terminal apparatus 30 of the present example embodiment is the same as the first to fourth example embodiments.

"Advantageous Effect"

According to the system of the present example embodiment described above, the same advantageous effect as the first to fourth example embodiments can be implemented. In addition, according to the system of the present example embodiment, in a case where the service provider is away from the appointment location, that is, in a case where a relatively long time is left before meeting between the service provider and the customer, the frequency of the biometric authentication of the service provider can be relatively decreased. In a case where the service provider is approaching the appointment location, that is, in a case where the timing at which the service provider meets the customer is approaching, the frequency of the biometric authentication of the service provider can be relatively increased. According to the system of the present example embodiment, by performing the biometric authentication with an appropriate frequency corresponding to the situation, it is possible to reduce inconvenience of an increase in processing burden by performing the biometric authentication an unnecessarily large number of times on an unnecessary occasion, or inconvenience of being unable to provide information useful for the customer due to an insufficient frequency of the biometric authentication on a necessary scene.

Sixth Example Embodiment

"Overview and Configuration of System"

A system of the present example embodiment is different from the first to fifth example embodiments in that a function of repeatedly performing the biometric authentication on not only the service provider but also the customer and transmitting a result of biometric authentication of the customer to the terminal apparatus 30 on the service provider side while the service provider is moving to the appointment location is provided. Other overviews and summaries of the system are the same as the first to fifth example embodiments.

Figure 15:
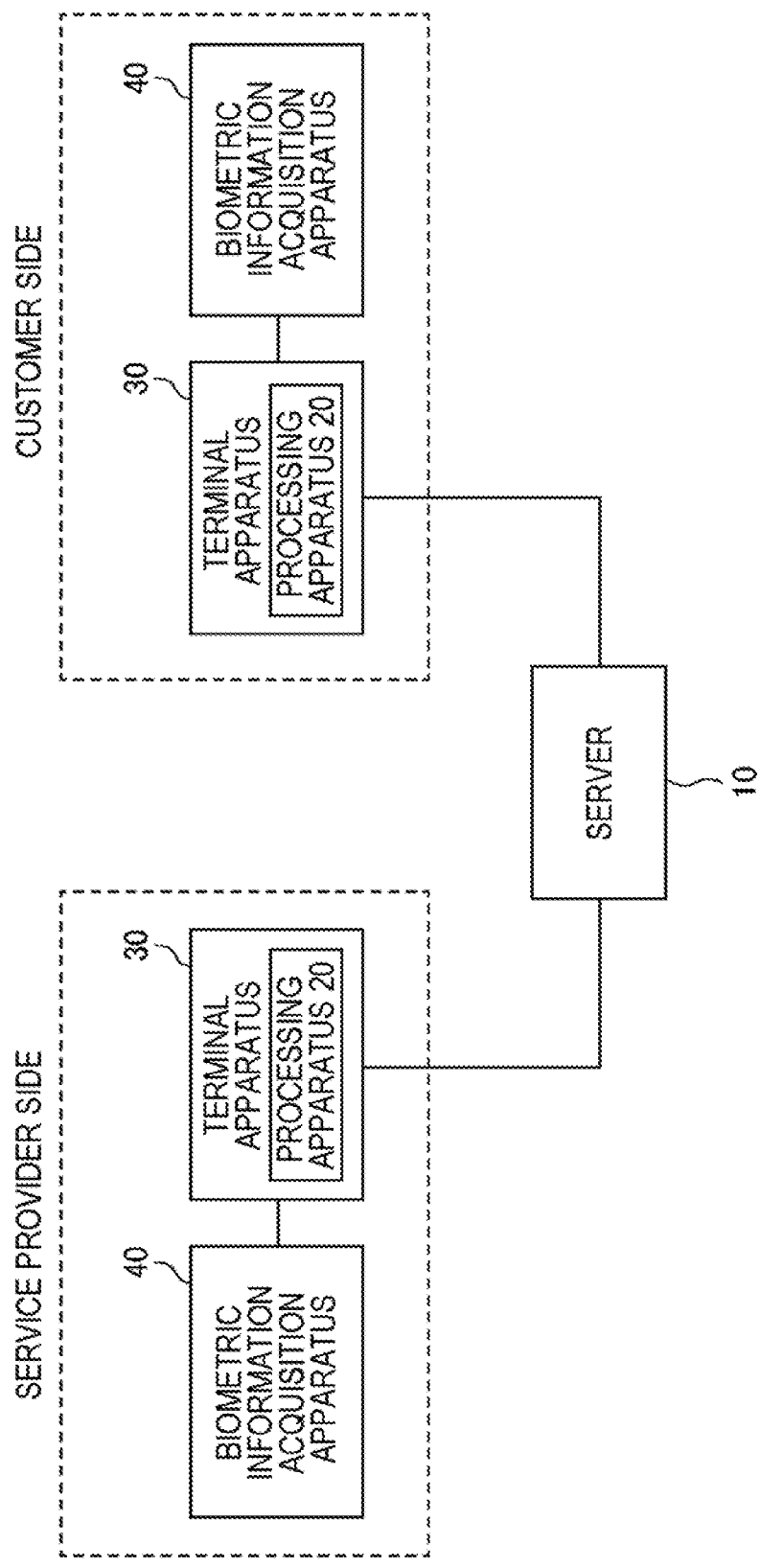
FIG. 15 is one example of the function block diagram of the system of the present example embodiment.
Figure 16:
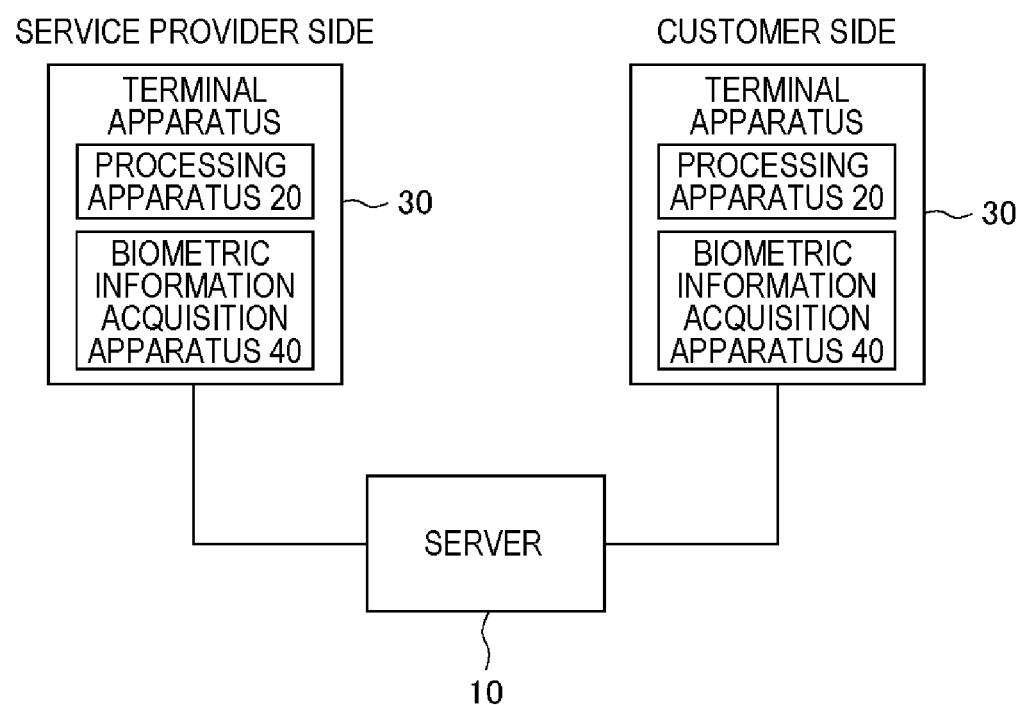
FIG. 16 is one example of the function block diagram of the system of the present example embodiment.

FIG. 15 and FIG. 16 illustrate one example of the function block diagram of the system of the present example embodiment. In a case where the function block diagram is compared with the function block diagram described in the first example embodiment, there is a difference in that the program (application) for implementing the function of the processing apparatus 20 is installed on the terminal apparatus 30 on the customer side, and that the terminal apparatus 30 on the customer side includes the biometric information acquisition apparatus 40 or is connected to the biometric information acquisition apparatus 40. Configurations of the processing apparatus 20 and the biometric information acquisition apparatus 40 are the same as the first to fifth example embodiments.

That is, the processing apparatus 20 implemented in the terminal apparatus 30 on the customer side acquires the authentication information including at least one of the biometric information repeatedly acquired from the customer heading toward the appointment location and the result of the biometric authentication based on the biometric information (authentication information acquisition unit 21), and transmits the authentication information to the server 10 (authentication information transmission unit 22).

In addition, in a case where the result of the biometric authentication of the customer is acquired, the processing apparatus 20 implemented in the terminal apparatus 30 on the customer side may transmit the result of the biometric authentication to the server 10 in a case where the result of the biometric authentication of the customer indicates the authentication failure, and not transmit the result of the biometric authentication to the server 10 in a case where the result of the biometric authentication indicates the authentication success.

In addition, in a case where the customer is positioned within the first standard distance from the appointment location, the processing apparatus 20 implemented in the terminal apparatus 30 on the customer side may transmit the result of the biometric authentication of the customer to the server 10 even in a case where the result of the biometric authentication indicates any of the authentication success and the authentication failure. In a case where the customer is not positioned within the first standard distance from the appointment location, the processing apparatus 20 may transmit the result of the biometric authentication of the customer to the server 10 in a case where the result of the biometric authentication of the customer indicates the authentication failure, and not transmit the result of the biometric authentication of the customer to the server 10 in a case where the result of the biometric authentication of the customer indicates the authentication success.

In addition, the processing apparatus 20 implemented in the terminal apparatus 30 on the customer side may perform a control for setting a performance frequency of the biometric authentication of the customer to be higher in a case where the customer is positioned within the second standard distance from the appointment location, than in a case where the customer is not positioned within the second standard distance from the appointment location.

In addition, in a case where a "notification indicating the start of movement to the appointment location" is received from the processing apparatus 20 implemented in the terminal apparatus 30 on the customer side, the authentication result acquisition unit 11 of the server 10 may transmit a request to start the biometric authentication to the processing apparatus 20 implemented in the terminal apparatus 30 on the customer side in response to the notification. The processing apparatus 20 implemented in the terminal apparatus 30 on the customer side may input the information for starting the biometric information acquisition processing into the biometric information acquisition apparatus 40 in response to the request.

Note that in a case where the appointment location registered in advance is a home of the customer, the authentication result acquisition unit 11 may not transmit the request to start the biometric authentication to the processing apparatus 20 implemented in the terminal apparatus 30 on the customer side, even in a case where the "notification indicating the start of movement to the appointment location" is received from the processing apparatus 20 implemented in the terminal apparatus 30 on the customer side. In a case where the appointment location is the home of the customer, it is possible to confirm, without performing the biometric authentication, that a person appearing in the appointment location is the real customer. Since unnecessary biometric authentication is not performed, reduction of the burden of the customer, reduction of the processing burden of the system, and the like are implemented.

Verification as to whether or not the appointment location is the home of the customer can be implemented by any scheme. For example, information indicating whether or not the appointment location is the home of the customer may be registered in a stage where task information as illustrated in FIG. 7 is registered in the server 10.

Other configurations of the server 10 are the same as the first to fifth example embodiments.

"Hardware Configuration of Server 10 and Terminal Apparatus 30"

One example of the hardware configuration of the server 10 and the terminal apparatus 30 of the present example embodiment is the same as the first to fifth example embodiments.

"Advantageous Effect"

According to the system of the present example embodiment described above, the same advantageous effect as the first to fifth example embodiments can be implemented. In addition, according to the system of the present example embodiment, while the service provider is moving to the appointment location, the biometric authentication can be repeatedly performed on not only the service provider but also the customer, and the result of the biometric authentication of each of the service provider and the customer can be transmitted to the terminal apparatus 30 on the other side.

According to the system of the present example embodiment, based on the information notified from the system, both of the customer and the service provider can avoid, in advance, inconvenience of meeting with a person impersonating the real service provider or a person impersonating the real customer in the appointment location.

Examples of reference forms are appended below.

1. A server including an authentication result acquisition unit that acquires a result of biometric authentication of a service provider based on biometric information repeatedly acquired from the service provider heading toward an appointment location for a customer, and a result transmission unit that transmits the result of the biometric authentication of the service provider to a terminal of the customer.

2. The server according to 1, in which the result transmission unit transmits the result of the biometric authentication of the service provider to the terminal of the customer in a case where the result of the biometric authentication of the service provider indicates authentication failure, and does not transmit the result of the biometric authentication of the service provider to the terminal of the customer in a case where the result of the biometric authentication of the service provider indicates authentication success.

3. The server according to 1 or 2, in which in a case where the service provider is positioned within a first standard distance from the appointment location, the result transmission unit transmits the result of the biometric authentication of the service provider to the terminal of the customer even in a case where the result of the biometric authentication of the service provider indicates any of authentication success and authentication failure, and in a case where the service provider is not positioned within the first standard distance from the appointment location, the result transmission unit transmits the result of the biometric authentication of the service provider to the terminal of the customer in a case where the result of the biometric authentication of the service provider indicates the authentication failure, and does not transmit the result of the biometric authentication of the service provider to the terminal of the customer in a case where the result of the biometric authentication of the service provider indicates the authentication success.

4. The server according to any one of 1 to 3, in which the authentication result acquisition unit performs a control for setting a performance frequency of the biometric authentication of the service provider to be higher in a case where the service provider is positioned within a second standard distance from the appointment location, than in a case where the service provider is not positioned within the second standard distance from the appointment location.

5. The server according to any one of 1 to 4, in which the authentication result acquisition unit acquires a result of biometric authentication of the customer based on biometric information repeatedly acquired from the customer, and the result transmission unit transmits the result of the biometric authentication of the customer to a terminal of the service provider.

6. The server according to 5, in which the authentication result acquisition unit performs the biometric authentication of the service provider and does not perform the biometric authentication of the customer in a case where the appointment location registered in advance is a home of the customer, and performs the biometric authentication of the service provider and the biometric authentication of the customer in a case where the appointment location registered in advance is not the home of the customer.

7. A processing method executed by a computer, the processing method including an authentication result acquisition step of acquiring a result of biometric authentication of a service provider based on biometric information repeatedly acquired from the service provider heading toward an appointment location for a customer, and a result transmission step of transmitting the result of the biometric authentication of the service provider to a terminal of the customer.

8. A program causing a computer to function as an authentication result acquisition unit that acquires a result of biometric authentication of a service provider based on biometric information repeatedly acquired from the service provider heading toward an appointment location for a customer, and a result transmission unit that transmits the result of the biometric authentication of the service provider to a terminal of the customer.

9. A program causing a computer to function as an authentication information acquisition unit that acquires authentication information including at least one of biometric information repeatedly acquired from a service provider or the customer heading toward an appointment location, and a result of biometric authentication based on the biometric information, and an authentication information transmission unit that transmits the authentication information to a server.

10. The program according to 9, in which the authentication information acquisition unit acquires the authentication information including the result of the biometric authentication, and the authentication information transmission unit transmits the result of the biometric authentication to the server in a case where the result of the biometric authentication indicates authentication failure, and does not transmit the result of the biometric authentication to the server in a case where the result of the biometric authentication indicates authentication success.

11. The program according to 9 or 10, in which in a case where the service provider or the customer is positioned within a first standard distance from the appointment location, the authentication information transmission unit transmits the result of the biometric authentication to the server even in a case where the result of the biometric authentication indicates any of authentication success and authentication failure, and in a case where the service provider or the customer is not positioned within the first standard distance from the appointment location, the authentication information transmission unit transmits the result of the biometric authentication to the server in a case where the result of the biometric authentication of the service provider indicates the authentication failure, and does not transmit the result of the biometric authentication to the server in a case where the result of the biometric authentication of the service provider indicates the authentication success.

12. The program according to any one of 9 to 11, in which the authentication information acquisition unit performs a control for setting a performance frequency of the biometric authentication to be higher in a case where the service provider or the customer is positioned within a second standard distance from the appointment location, than in a case where the service provider or the customer is not positioned within the second standard distance from the appointment location.

13. A processing apparatus including an authentication information acquisition unit that acquires authentication information including at least one of biometric information repeatedly acquired from a service provider or the customer heading toward an appointment location, and a result of biometric authentication based on the biometric information, and an authentication information transmission unit that transmits the authentication information to a server.

14. A processing method executed by a computer, the processing method including an authentication information acquisition step of acquiring authentication information including at least one of biometric information repeatedly acquired from a service provider or the customer heading toward an appointment location, and a result of biometric authentication based on the biometric information, and an authentication information transmission step of transmitting the authentication information to a server.

This application claims the benefit of priority of Japanese Patent Application No. 2018-185175 filed on Sep. 28, 2018, the entire disclosure of which is incorporated herein by reference.

What is claimed is:

1. A server comprising:
at least one processor; and
at least one memory storing one or more instructions executable by the processor to:
acquire, from a terminal of a customer, information indicating reception of a first user input and a second user input, the first user input indicating that a service provider has started moving to an appointment location at which the service provider is to meet the customer, and the second user input indicating that the service provider has met the customer;
determine that the appointment location was registered in advance as a home of the customer;
in response to determining that the appointment location was registered in advance as the home of the customer, do not perform biometric authentication of the customer;
acquire a result of biometric authentication of the service provider that is performed based on biometric information repeatedly acquired using a biometric detection device, from the first input to the second input, from the service provider heading toward the appointment location;
transmit, through a communication network using a network interface, the result of the biometric authentication of the service provider to a terminal of the customer;
in response to the service provider being positioned within a standard distance from the appointment location, cause the biometric detection device to repeatedly acquire the biometric information of the service provider at a first frequency; and
in response to the service provider not being positioned within the standard distance from the appointment location, cause the biometric detection device to repeatedly acquire the biometric information of the service provider at a second frequency less than the first frequency.

2. The server according to claim 1,
wherein the one or more instructions stored by the at least one memory are executable by the at least one processor to:
transmit the result of the biometric authentication of the service provider to the terminal of the customer only where the result of the biometric authentication of the service provider indicates authentication failure and not authentication success.

3. The server according to claim 1,
wherein the one or more instructions stored by the at least one memory are executable by the at least one processor to, in response to the service provider being positioned within a different standard distance from the appointment location, transmit the result of the biometric authentication of the service provider to the terminal of the customer regardless of whether the biometric authentication of the service provider indicates authentication success or authentication failure, and the one or more instructions stored by the at least one memory are executable by the at least one processor to, in response to the service provider not being positioned within the different standard distance from the appointment location, transmit the result of the biometric authentication of the service provider to the terminal of the customer only where the result of the biometric authentication of the service provider indicates the authentication failure and not transmit where the result of the biometric authentication indicates the authentication success.

4. A processing method executed by a computer, the processing method comprising:

acquiring, from a terminal of a customer, information indicating reception of a first user input and a second user input, the first user input indicating that a service provider has started moving to an appointment location at which the service provider is to meet the customer, and the second user input indicating that the service provider has met the customer;

determining that the appointment location was registered in advance as a home of the customer;

in response to determining that the appointment location was registered in advance as the home of the customer, not performing biometric authentication of the customer;

acquiring a result of biometric authentication of a service provider that is performed based on biometric information repeatedly acquired using a biometric detection device, from the first input to the second input, from the service provider heading toward the appointment location;

transmitting, through a communication network using a network interface, the result of the biometric authentication of the service provider to a terminal of the customer;

in response to the service provider being positioned within a standard distance from the appointment location, causing the biometric detection device to repeatedly acquire the biometric information of the service provider at a first frequency; and in response to the service provider not being positioned within the standard distance from the appointment location, causing the biometric detection device to repeatedly acquire the biometric information of the service provider at a second frequency less than the first frequency.

5. The server according to claim 1, wherein the one or more instructions stored by the at least one memory are executable by the at least one processor to:

store information associating a task ID with a service provider ID and a customer ID, and after receiving the task ID, the service provider ID, and information indicating that the service provider has started moving to the appointment location, decide the customer to which to transmit the result of the biometric authentication of the service provider based on the stored information and the received information.

\* \* \* \* \*